(12) United States Patent
Watanabe (10) Patent No.: US 8,113,895 B2
(45) Date of Patent: Feb. 14, 2012

(54) ARTICLE SUCH AS SURFBOARD AND PRODUCTION METHOD THEREOF

(76) Inventor: Yoshihiro Watanabe, Iwaki (JP)

( * ) Notice: Subject to any disclaimer, the term of this patent is extended or adjusted under 35 U.S.C. 154(b) by 800 days.

(21) Appl. No.: 12/085,747

(22) PCT Filed: Dec. 16, 2006

(86) PCT No.: PCT/JP2006/325114
§ 371 (c)(1),
(2), (4) Date: May 29, 2008

(87) PCT Pub. No.: WO2007/069746
PCT Pub. Date: Jun. 21, 2007

(65) Prior Publication Data
US 2009/0286433 A1    Nov. 19, 2009

(30) Foreign Application Priority Data
Dec. 16, 2005  (JP) .................................. 2005-362827

(51) Int. Cl.
*B63B 35/79* (2006.01)
(52) U.S. Cl. ......................................... 441/74; 114/357
(58) Field of Classification Search ............... 114/39.14, 114/357; 441/74, 65
See application file for complete search history.

(56) References Cited

U.S. PATENT DOCUMENTS

| 4,209,867 A * | 7/1980 | Abrams, III | 441/74 |
| 6,635,112 B1 * | 10/2003 | Choy et al. | 118/620 |

FOREIGN PATENT DOCUMENTS

| JP | 07-187067 | 7/1995 |
| JP | 2001-206286 | 7/2001 |
| JP | 2002-347128 | 12/2002 |

* cited by examiner

*Primary Examiner* — Edwin Swinehart
(74) *Attorney, Agent, or Firm* — Muramatsu & Associates (57) ABSTRACT

A production method of an article for water sports such as a surfboard with a hollow structure achieves a wide range of selections for users. The article is established with sufficient strength and durability, and is capable of achieving low cost and short delivery time. The article is configured by an outer shell having a hollow structure for forming an outer shape of a main body of the surfboard, a partition wall arranged within an internal space of the outer shell for connecting inner surfaces facing one another in said internal space, sectioned spaces separated and sealed by said partition wall and the inner surfaces of the outer shell, and a vent hole formed on said partition wall so that the sectioned spaces adjacent to one another can properly communicate with one another.

12 Claims, 11 Drawing Sheets

ARTICLE SUCH AS SURFBOARD AND PRODUCTION METHOD THEREOF

FIELD OF THE INVENTION

The present invention relates to an article for water sports such as a surfboard used in wave riding games and surfing competitions, as well as an article such as a floating body having the same purpose and function, for example, a body board or a wind surfing board used in water games or an under/surface water scooter for business use (hereafter collectively referred to as "an article such as a surfboard"), and a production method thereof. More particularly, the present invention relates to an article such as a surfboard configured by a hollow structure having an internal space within a main body for achieving buoyancy where the internal space has sectioned spaces established in the hollow structure by partition walls, and a production method thereof.

BACKGROUND OF THE INVENTION

An example of a conventional article such as a surfboard is configured by a structure where an entire outer surface of urethane foam, which is a main body formed into the shape of the article, is coated and reinforced by FRP (Fiber Reinforced Plastics) (hereafter "first conventional technology"). Such a structure of urethane foam requires a predetermined strength, lightness in weight, and a degree of adhesion with the FRP.

Another example of conventional article such as a surfboard is configured by a structure where a hollow space is formed therein through a flow of urethane resin into a mold (hereafter "second conventional technology"), and such a structure is required to be light in weight, low in cost, and a variety of outer shape (various types of mold).

Further, in Japanese Laid-Open Publication number 2001-206286, it is disclosed a structure of surfboard established by reinforcing material called stringers within an inner space of a hollow structure where the stringer is attached to connect two inner facing surfaces along the longitudinal direction of the main body having the hollow structure.

Further, as a non-patent document 1, an article such as a surfboard with a hollow structure therein is introduced in a website on internet. For example, "Article Such as Hollow Carbon Fiber Surfboard" sold by a manufacturer "AVISO" is disclosed along with a cross sectional diagram showing its inner structure.

Moreover, as another non-patent document 2, "Salomon", a large manufacturing and wholesale company of articles such as hollow surfboards, is manufacturing and selling a product called "S-CORE" as disclosed by its website.

Patent Document 1: Japanese Laid-Open Publication No. 2001-206286
Non-Patent Document 1: Website address that discloses the information on "AVISO"—http://www.nakisurf.com/faq/faq-board.html
Non-Patent Document 2: Home page address for "Salomon"—http://www.salomon.co.jp/index.html

DISCLOSURE OF THE INVENTION

Problems to be Solved by the Invention

The article for water sports such as a surfboard involved in the first conventional technology is a structure formed by attaching two types of materials together, thus, there arises a problem related to durability since the surfboard would crack, or the two materials put together would separate from one another due to impact or deterioration caused by UV rays. In addition, although bubbles of urethane foam can be made larger when desiring to reduce the weight of the urethane foam of the basic structure, it will reduce the strength. Further, since the manufacturer of an article such as a surfboard has to cut each bulk of urethane foam into a desired shape, a long manufacturing time is required, resulting in a large burden of production costs and long delivery times. Moreover, since the urethane foam of the basic structure is a homogenous material, it is not possible to freely change the setting of the elasticity on the main body.

With respect to the article such as a surfboard involved in the second conventional technology, since the outer shape directly related to the performance of the article such as the surfboard is formed through the mold flow using a pre-established mold frame, it cannot be formed into a shape that fits to particular personality of each individual user, resulting in a small range of selection in the shape. Since the shape based on the mold flow process is conducted by a standardized mass production system, the personal preference of the user cannot be taken into account, thus creating a problem of not having any contact between the manufacturer and users. Also, since a core material is used inside the article such as the surfboard, it is not a complete hollow structure. Further, as mentioned above with respect to the first conventional technology, there is a limit with respect to the setting of the elasticity variations on the main body, i.e., such elasticity cannot be properly changed.

In addition, all of the surfboards with a hollow structure as disclosed by Non-Patent Documents 1 and 2, are presumed to be mass produced, thus, the skills carried by many shapers, including manufacturers, designers, and builders, cannot be properly incorporated to provide each user with the best product, as is with the conventional manufacturing method (method for shaping out the form). Further, the stringer as explained above is only used as a strength maintaining skeletal material for preventing damages, and not to form sectioned spaces by partition walls within the inner space and properly adjust the material and elasticity variations of the main board voluntarily or by user's preference, thus, requiring the surfboards to be standardized. As a result, with respect to the hollow structure, the rate of use of the currently selling surfboards is extremely low, and they are difficult to be accepted in an actual surfboard market. Due to this, the next generation surfboards in terms of structure, material, and distribution has been long desired, however, it is yet to be achieved. One of the main reasons for this is, in the hollow structure, because it is difficult for the shaper who is a manufacturer of the article such as a surfboard to manufacture an optimum surfboard or a surfboard that has desired performance which incorporates the ability and preference of each particular user.

The present invention has been made in view of the situation noted above, and it is an object to provide an article such as a surfboard and a production method thereof with a wide range of selections for users. In the present invention, the article is established with sufficient strength and durability, and is capable of achieving low cost and short delivery time. Further, in the present invention, the article is capable of sufficiently implementing the ability of the manufacturer and freely incorporating the characteristics such as strength, resilience, and toughness thereof to match with each user's preference, thereby providing a wide range of selection of articles such as surfboards and their production method.

Means to Solve the Problems

In order to solve the above-mentioned problems, an article such as a surfboard and the production method thereof under the present invention is structured as described in the following.

First, an article for water sports such as a surfboard is configured by an outer shell having a hollow for forming an outer shape of the article such as a surfboard, partition walls that are established so that inner surfaces facing one another inside the outer shell are connected, sectioned spaces that are separated by the partition walls in an air-tightly sealed manner with respect to an outside, and vent holes established on the partition walls so that gas can pass through the sectioned spaces and adjoining spaces.

In addition, the article such as the surfboard is comprised of an outer shell for forming the outer shape of the main article such as the surfboard, partition walls established along the longitudinal direction of the article such as the surfboard in the internal space surrounded by the outer shell, and vent holes formed on the partition walls so that gas can pass through the sectioned spaces partitioned by the partition walls. The outer shell and the partition walls are integrally formed as one unit, and more preferably, such a one unit is established through molding performed at the same time.

In the above sectioned spaces, inactive gas such as helium or nitrogen, or other gas such as air can be loaded at a proper pressure, and by increasing or decreasing the pressure of the loaded gas (space pressure), the individual sectioned spaces within the internal space of the outer shell can be set to have pressures different from one another. In this arrangement, the article such as a surfboard further includes a loading valve for loading the gas into the internal space and (or) sectioned spaces, and a pressure adjusting valve for relieving the gas therein in response to the pressure change of the loaded gas.

As for the thickness of the outer shell, a center area along the longitudinal direction can be made thinner than areas near the ends of the outer shell.

Next, the article such as the surfboard described above is produced by the production method described in the following.

Namely, after uniformly supplying a liquid of photo-curing resin that is yet to be cured at a predetermined depth on an up/down moving table while maintaining a horizontal plane, a light beam such as a laser beam, UV ray, or visible light is irradiated onto the liquid surface of the above noted photo-curing resin based on two-dimensional surface data showing a virtual cross sectional shape of the predetermined end portion extracted from three-dimensional shape data that expresses the three-dimensional shape of the article, and the photo-curing resin within this irradiated area is cured, thereby the first layer of the solid piece with a predetermined thickness based on the surface data is created. Next, the table is lowered at a predetermined depth (the thickness of the resin layer cured by one irradiation operation), a liquid of the photo-curing resin that is yet to be cured is uniformly supplied on the top surface of the first solid piece, and a light beam based on the surface data of the virtual cross sectional shape next to the virtual cross sectional shape formed by the first solid piece layer noted above in an overlapping fashion is irradiated, where a second solid piece layer is consecutively and integrally build on the first solid piece layer and cured as one unit. Hereafter, the cycle of operation noted above is sequentially repeated until it reaches the n-th layer that is the end portion of the surfboard, thereby ultimately producing the three-dimensional shape of the article.

Further, the article for water sports such as a surfboard is shaped and manufactured by uniformly supplying the liquid of photo-curing resin to the top of the table, extracting the shape data of the cross cut virtual surface that is substantially perpendicular to the longitudinal direction of the article such as a surfboard based on the shape data of the article such as a surfboard, irradiating the light beam such as a laser beam on the photo-curing resin based on the extracted shape data to form a resin layer of predetermined thickness, and lowering the table corresponding to the thickness of one layer of the article to conduct the same operation again after the completion of the irradiation, thereby the cured layers are repeatedly combined over multiple layers to ultimately producing the three-dimensional shape of the article.

Further, shape data of supports that are attached to the article to stabilize the article such as a surfboard during the production process can be added, where the surface data of each cross sectional shape is extracted from the shape data of both the supports and the article noted above, and by irradiating the light beam at the same time or continuously, the main body of the article such as a surfboard as well as the supports can be created simultaneously.

EFFECTS OF THE INVENTION

By implementing the above noted structure, the present invention achieves the significant effects as described in the following.

The article such as a surfboard (hereafter simply referred to as "board") has a hollow structure, forms sectioned spaces in the internal space by the outer shell and the partition walls, and integrally forms the outer shell and partition walls as one unit, thus, the board can be formed with light weight in comparison to the board in the conventional technology which is manufactured through engraving a solid mass or the conventional hollow structure where reinforcing ribs are attached to the inside of the surface material of the outer shell. In addition, the board that has high ability of maintaining the shape, high strength and resiliency, as well as toughness can be formed.

Further, the arrangement of the partition walls are not limited in the longitudinal direction of the board, but can also be established in the transversal direction that crosses the longitudinal walls by constructing a proper alignment such as a grid-like (rectangular section), diagonal crossing (diamond section), or honeycomb-like structure for a design that considers the strength of the board, or more particularly, the strength at each location. In other words, a remarkable effect is achieved by dramatically improving the freedom of the design.

In addition, by filling the pressurized gas in the sectioned spaces, the surface strength of the outer shell can be increased while reducing its weight. This means that the individual buoyancy created in each portion can be set separately from one another, where as a result, the balance position of the board and the center position of the buoyancy of the board, which is the resultant force of the buoyancy from each portion, can be freely set. Also, the pressure can be reduced in the sectioned spaces as long as the strength can be available.

The achievement of the degree of freedom in such a sophisticated design means that the requirements of the board suiting to the abilities of a user or performances of the board that is preferable to the user can be satisfied easily and quickly.

Next, since the vent holes are formed in the proper shape at the proper locations of the partition walls that constructs each sectioned spaces, the capacity of the sectioned spaces can be properly set. Further, since a loading valve and a pressure adjusting valve are established in each sectioned space as needed, the internal pressure can be adjusted and the excess internal pressure due to the rise in outside temperature can be released to avoid rupture due to the expansion. More particularly, since these types of boards are used on the ocean or at the beach, the rise in the temperature due to the direct sunlight is enormous, thus, the structure having such valves is indispensable.

In the production method of the present invention, based on the shape data of the board stored in advance in a computer as three-dimensional data, where the surface data expressing the cross cut surface of the desired location of the board for the liquid of photo-curing resin is extracted, the area matching this surface data is irradiated with a light beam to form a layer-like solid piece, then by an operation for lowering the table by a thickness of the next layer formation, the solid piece is sequentially built-up towards the next layer and unified (hereafter referred to as a "building-up formation"), where boards that have the same shape and behavior can be mass produced in a short time. Further, the proper adjustment and modification of the shape can be easily performed by modifying the data in the computer, thus, a board with a personality can be easily manufactured.

Moreover, since the outer shell and the partition walls are integrally formed through the formation process with the same material, an imbalance in strength from using an adhesive to attach materials that have been formed separately can be avoided, hence, it is possible to significantly increase the durability of the board.

In addition, since the building-up method using the photo-curing resin is performed, supports for preventing overturns of the main body can be formed in parallel at the same time with the main body of the article such as a surfboard, thus, the measure for maintaining the stability of the main body of the article such as a surfboard can be executed at the same time.

EXPLANATION OF REFERENCE NUMERALS

1: Platform (table)
2: Laser beam irradiator
3: Cure resin layer of surfboard
3a: Hole
4: Cured resin layer of support
5: Base support
10, 20, 30, 40: Surfboard
10a, 20a, 20b: Partition wall
20c, 30c, 30d: Vent hole
10g, 20g, 30g, 40g: Outer shell
40a: Thin wall
40b: Thick wall
L: Laser beam

PREFERRED EMBODIMENT OF THE INVENTION

The preferred embodiment of the present invention will be explained in the following with reference to the drawings. Here, the following explanation is directed to the case where the present invention is applied to a surfboard which is a typical example of article for water sports.

The surfboard related to the embodiment of the present invention is formed by using the shape data (wired frame, etc.) of the surfboard created as three-dimensional CAD data, where a liquid of photo-curing resin is cured one by one with one layer at a time starting from the bottom end of the surfboard in the longitudinal direction and building up from there on, or namely, it is formed by a three-dimensional building-up method. The surfboard is continuously formed per cross section and formed into a hollow structure where partition walls established with vent holes for mutually connecting the spaces that penetrate the surfboard in the longitudinal direction are formed therein.

In a specific formation process, support data for forming the supports for preventing overturns of the surfboard is added to sliced cross section data of the surfboard established with partition walls to form production data, and parameters for various three-dimensional building-up tools such as a laser scanning speed, a laser output level, a number of re-coating, an amount of offset, and a contraction rate, etc. are set. As for the above-mentioned supports, since the building-up starts from the bottom end of the surfboard in the longitudinal direction, the support data is added to the sliced cross section data (surface data) to form three to six supports in parallel at the same time with the formation of the main body of the surfboard so that the main body will not fall over during the building-up process.

Figure 1:
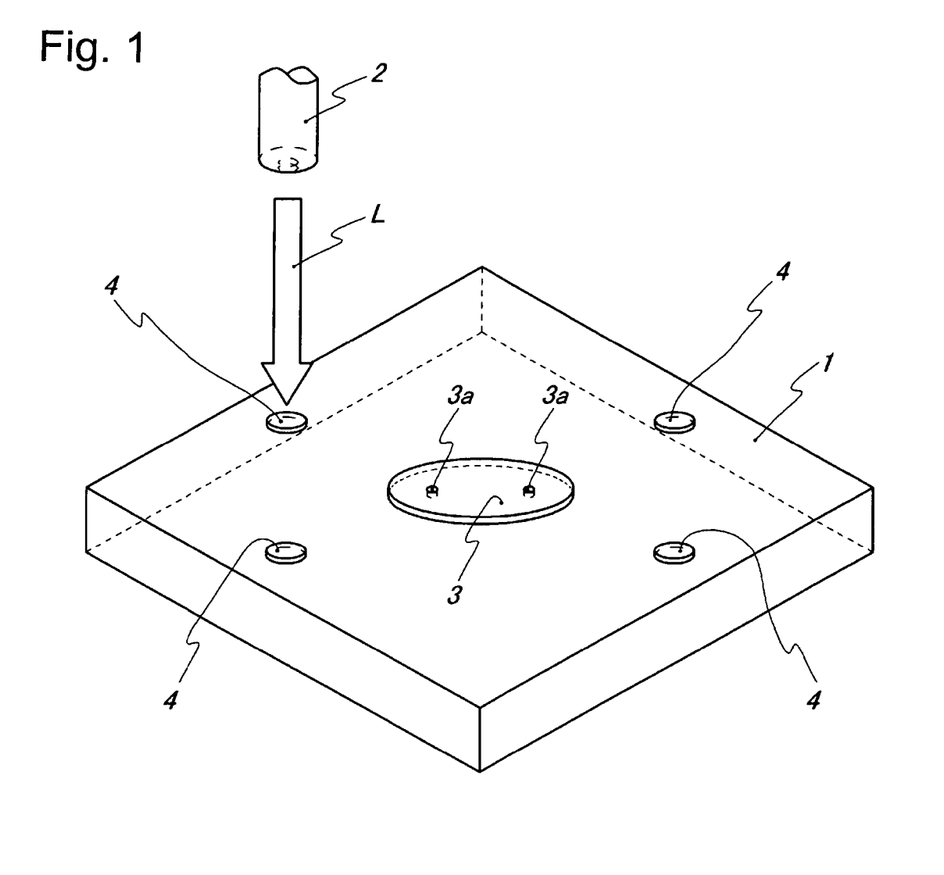
FIG. 1 is a perspective view showing the setting of a table incorporated in the preferred embodiment of the present invention.
Figure 2:
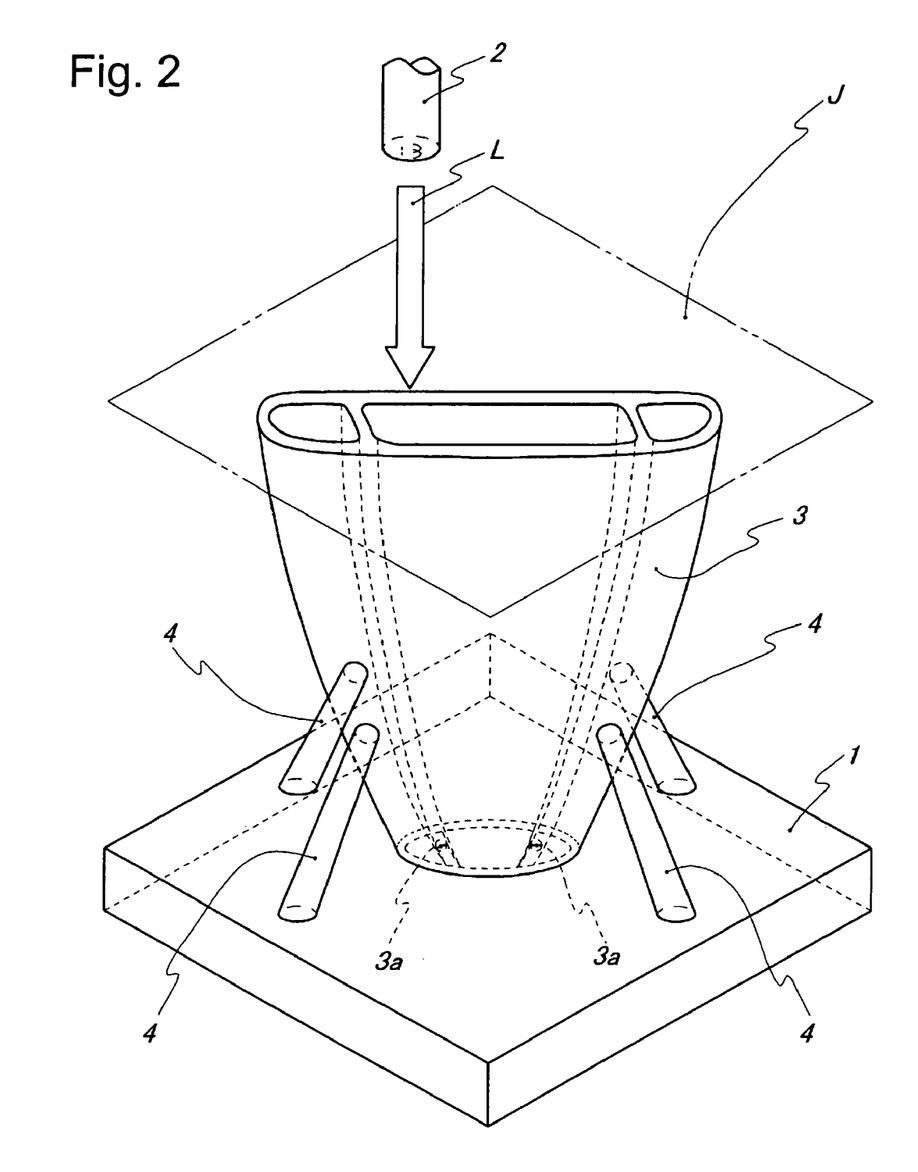
FIG. 2 is a perspective view showing a production process incorporated in the preferred embodiment of the present invention.

FIGS. 1 and 2 show the production process of the surfboard related to the present embodiment.

First, as shown in FIG. 1, a platform (table) 1 is lowered down by an amount corresponding to a thickness of 0.1-0.2 mm for curing the first layer where it is uniformly supplied with a liquid of fluid photo-curing resin to form a pre-cured resin layer of predetermined thickness. Next, based on the above sliced cross section data and support data, a laser beam L from a laser beam irradiator 2 is scanned over the resin surface upon adjusting its strength and irradiated to cure the pre-cured photo-curing resin. By this operation, the first cured layer is formed, and the resin in the area of the light irradiation is solidified, thereby forming a cured thin resin layer (ex., a cured resin layer 3 for the surfboard and a cured resin layer 4 for the support) corresponding to the cross section data.

On the very first cured resin layer 3 for the surfboard, two holes 3a for discharging the pre-cured resin that remained in the internal space of the sequentially formed surfboard are formed. These holes 3a are also used as prepared holes for forming mounting holes that will mount a loading valve 24 and a release valve 25 that will be explained later. By forming the previously mentioned holes 3a over multiple layers, the holes 3a become through holes that penetrate the internal space.

After the end of the irradiation, the table 1 is lowered down by one layer to repeat the same operation and form a resin layer, where the laser beam L is scanned and irradiated in the same way noted above on the top of the first layer to form a second layer. The irradiated energy of the second layer is slightly larger than the energy used for curing only the thickness of the second layer so that a chemical reaction is created between the second and first layer to strongly bond them together and build-up as a homogenous cured layer.

This operation is repeated over multiple layers (n layers) to build-up to the n-th layer (the tip of the top end of the surfboard in the longitudinal direction) of the surfboard (FIG. 2 shows a halfway state to the completion). An area J indicated by a two-dot chain line in FIG. 2 shows the resin surface of the photo-curing resin where the main body of the surfboard is formed halfway. After all the layers are cured, the table (platform) 1 is raised all the way up to the highest level to remove the formed model (the surfboard portion), then the remaining accumulated pre-cured resin in the internal space is discharged through the previously mentioned holes 3a, the model then goes through a final curing process with a post-curing device for conducting an overall reprocessing after rinsing, where the supports that are now unnecessary are removed from the model and the surface of the model is polished to the completion.

The three-dimensional data (the sliced cross section data) of the surfboard expresses the basic shape of the standard outer shape/internal structure where the designer can analyze and modify the data to be appropriate to a particular user.

The surfboard produced by the production method of the present embodiment is shown in FIGS. 3-8.

The surfboard related to the present embodiment has a hollow structure in which at least one partition wall 10a, 20a, or 20b is provided along the center reference line in the internal space of the outer shell 10g, 20g, 30g, 40g that has a compressed spindle-like outer shape, where several vent holes 20c, 30c, 30d mutually connecting the internal spaces separated by partition walls are established on the partition walls 20a, 20b.

For example, as for the number of partition walls with respect to design modifications, using a reference line that extends in the longitudinal direction and crosses the center of the transversal line, one side of the outer shell can be formed by one to five partition walls that are symmetrical to the reference line. On the surfboard 10 shown in FIG. 3, two partition walls 10a on each side so that the total of four partition walls are established, and on the surfboard 20 shown in FIGS. 4 and 5, one partition wall 20a is formed in a longitudinal direction through the center of the width so that one partition wall 20b is established on each of the right and left sides thereof.

The minimum number of partition walls is one where it is established along the center reference line, and the maximum number of partition walls will be determined based on the shape, weight, and other characteristics of the surfboard.

In the foregoing, an example of the shape of a partition wall is shown which is formed on the entire longitudinal direction of the surfboard, however, it is also possible to be partially formed along the longitudinal direction, or namely, in a discontinuous manner. More particularly, in the center area of the longitudinal direction, the partition wall may be obviated in order to improve the elasticity of the center area.

As for the thickness of a partition wall as a design modification parameter, it is possible to select from a range between 0.5 mm-5 mm (preferably 0.5 mm). Also as a parameter for the design modification, the partition wall is provided with 1-50 vent holes. In the surfboard 20 shown in FIGS. 4 and 5, each partition wall 20a and 20b is penetrated by five vent holes 20c. In the surfboard 30 of FIG. 6, large and small vent holes totaling 16 vent holes are formed thereon.

The maximum value of the diameter of the vent hole as a design modification parameter is equal to the height of the partition wall and the minimum value thereof is 3 mm. More preferably, as for the dimension of the diameter of the vent hole, it is equal to the height of the partition wall for the elasticity setting part which is an area intended to have elasticity (area close to the center of the surfboard), and is equal to 3 mm for the part that does not require the elasticity (areas close to the top end and the bottom end of the surfboard). In addition, the shape of the vent holes near the center of the longitudinal direction of the surfboard that requires the elasticity variation is preferably elliptical. In the surfboard 30 shown in FIG. 6, the vent hole 30d formed on the partition wall 30a is shaped like a circle, and the vent hole 30c is shaped like a long hole (elliptical hole).

As for the minimum value of the diameter of the vent hole noted above, the minimum building-up value 0.1 mm which is capable of formation in the current three-dimensional building-up method and a sufficient ventilation function are considered to determined the minimum value of the diameter so that it will not create a discontinuous surface that would be a structural defect in the vent hole formation.

As for the structural characteristic of the outer shell as a design modification parameter, the thickness values between 0.5 mm-5 mm are preferably distributed where the area near the center of the surfboard in the longitudinal direction is formed thinner than the other areas such as both ends of the surfboard in the longitudinal direction. The maximum value 5 mm of the outer shell thickness is established on both ends of the surfboard in the longitudinal direction. This is because they are, from experience, easily damaged by unexpected accidents particularly during transportation, thus, they have a thickness that is 5 mm or less which will not substantially affect the overall weight. The minimum value 0.5 mm of the outer shell thickness is determined to be within the range where a discontinuous surface is not created under the formation minimum value in the current three-dimensional building-up method. Thus, the proper dimensional values within the above-mentioned range will be used. In the surfboard 40 of FIG. 7, a thin area 40a is formed near the center of the surfboard in the longitudinal direction, and a thick area 40b is formed near each end thereof.

The connecting points mentioned above between the partition walls and the outer shell are structured in such a way that the corners are rounded within a radial range of 0.5 mm-1 mm (preferably 0.5 mm) so that a discontinuous surface will not form (see FIG. 5), thereby preventing a concentrated stress. The numeric value range of the rounded corners is determined by considering the size that can eliminate and prevent discontinuous surfaces and structural defects in the connecting points in view of the minimum value 0.1 mm in the current three-dimensional building-up method. When the radius of curvature becomes larger, the formation area increases which leads to the increase of the weight, thus, the dimension is determined so that it can satisfy the needs of lightweight, etc.

Figure 5:
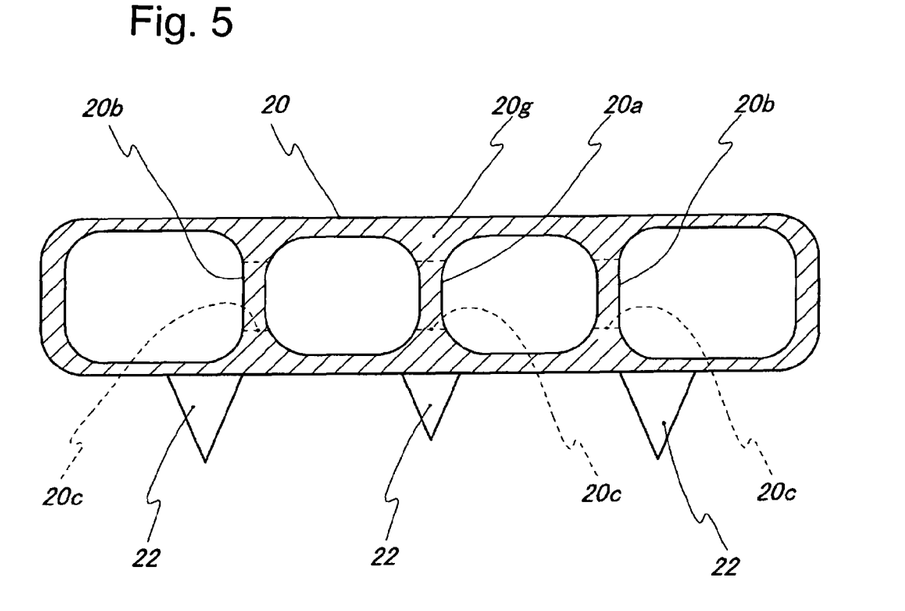
FIG. 5 is a cross sectional view showing a transversal cross section of the surfboard related to the preferred embodiment of the present invention.
Figure 6:
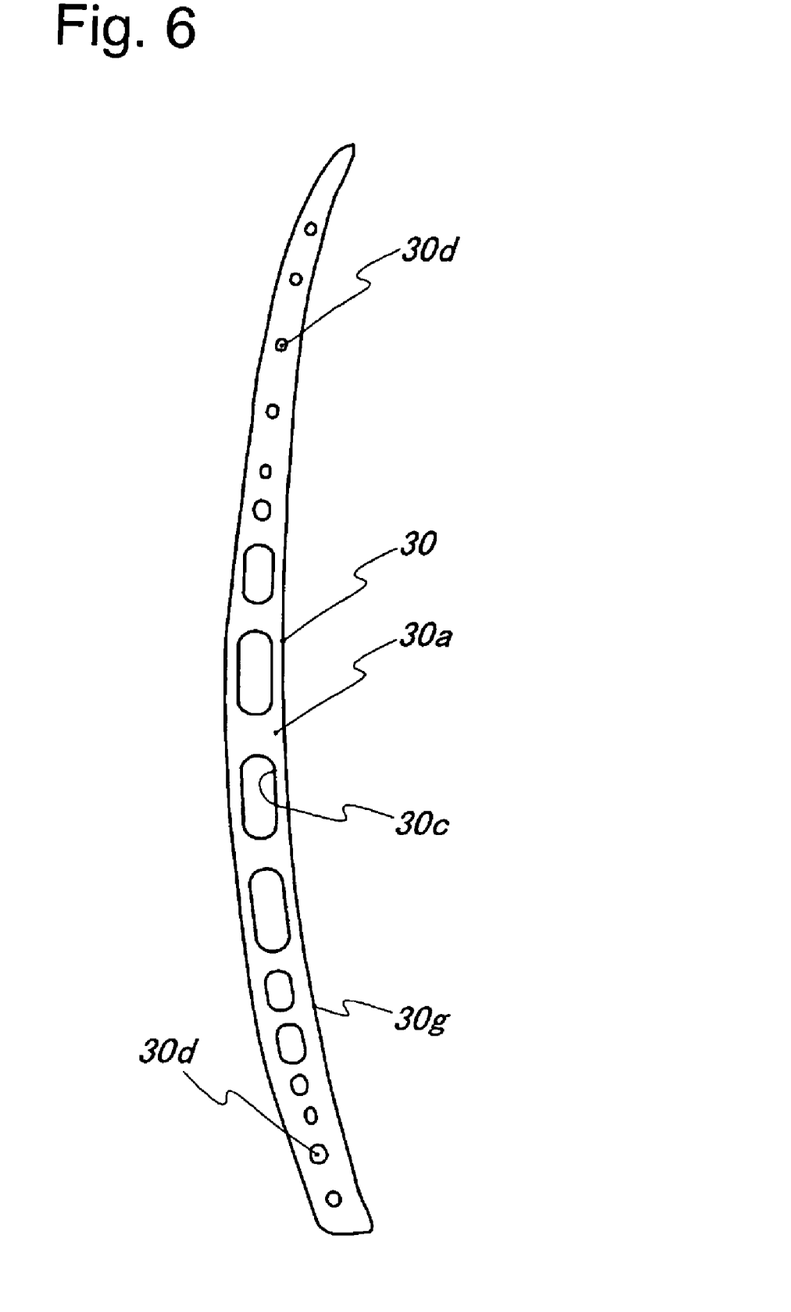
FIG. 6 is a plan view showing a partition wall incorporated in the preferred embodiment of the present invention.
Figure 7A:
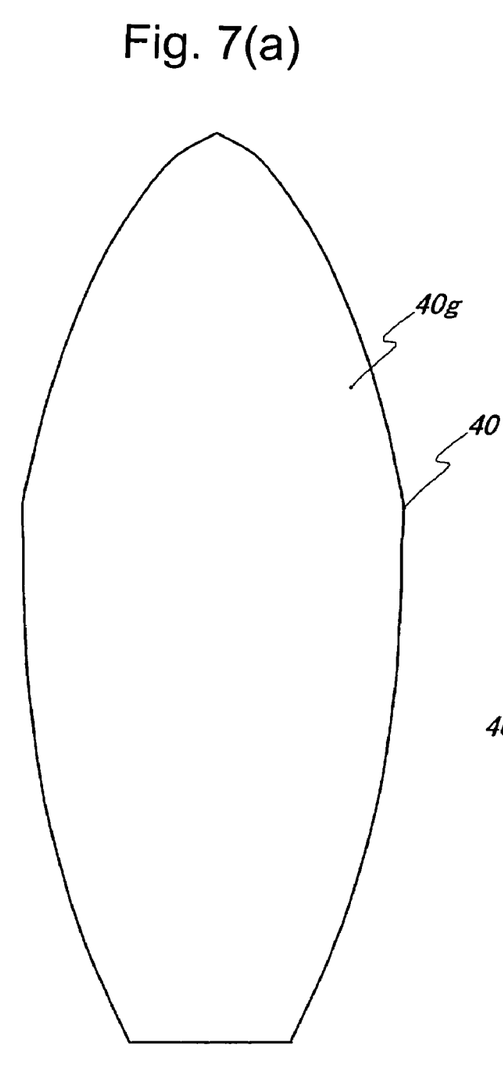
FIG. 7 is a view including a side view and a plan view showing the surfboard incorporated in the preferred embodiment of the present invention.
Figure 7B:
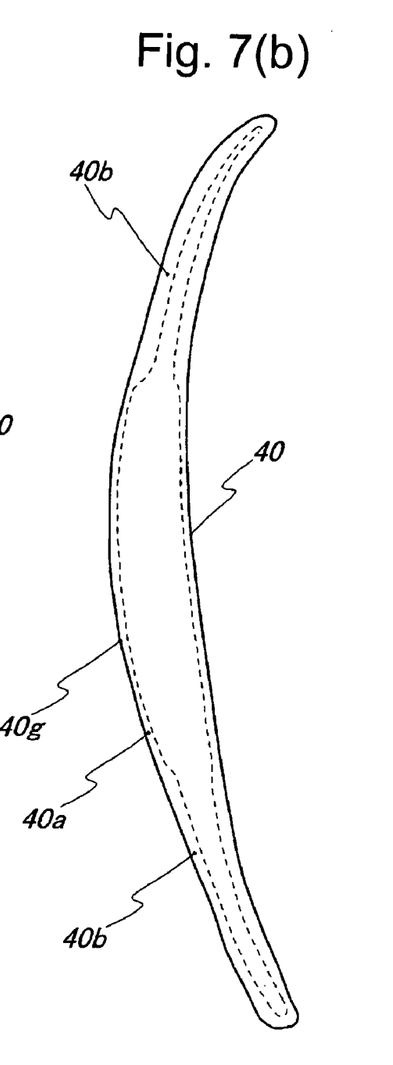

As shown in FIG. 5, the bottom of the surfboard 20 is provided with skegs (fins) 22b of a desired shape and a number. The skegs can be integrally formed as one unit on the surfboard or as separate parts that are then attached to the surfboard.

The numerical values of the surfboard will further be explained as follows for an example of the case where resin HS-680 marketed by CMET Corporation is used. As for the minimum value of each numeric value of the outer shell, it is defined as the strength that can hold a human weight by a surface area under the bottom of one foot. This is because, although normally, having both feet planted on the surfboard is a preferable condition, it is assumed that only one foot would be placed on the surfboard when having a trouble during the use of the surfboard.

Consequently, when an surface area of the bottom foot (one foot) is 150 cm$^2$ and a body weight is 65 kg (numeric value of the applicant himself based on an actual measurement) for a nominal bending strength 100 MPa/cm$^2$ with respect to the material HS-680 noted above, a body weight load (bending stress) for a unit area of the surfboard is 65/150=0.43 kgf/cm$^2$=0.0421 MPa/cm$^2$.

Therefore, the relationship between the nominal bending strength and the load based on the body weight of the user is the body weight load 0.0421 MPa/cm$^2$ for the surfboard with a nominal bending strength of 100 MPa/cm2, where the material value of the surfboard used here exceeds the load by a large margin. Thus, 0.5 mm that will not create any discontinuous surfaces from the minimum forming thickness value 0.1 mm is employed as a minimum value for each numeric value. When the minimum value is used, it can achieve the least weight value for an overall surfboard.

Further, from the calculations, the shape can be maintained and the function of the surfboard can be achieved even if the partition wall is not used. However, since it is required that both right and left sides of the surfboard deform symmetrically during use, it is designed that at least one partition wall is formed along the center reference line. This is because if there is no partition wall, deformation will occur even in the areas that do not require elasticity (top end and bottom end of the surfboard). Since deformed areas will concentrate at the center of the surfboard in the width-wise direction, deformed areas can be freely selected by settings, for example, a number of partition walls, a thickness of the partition walls, and a shape and number of vent holes.

Figure 3A:
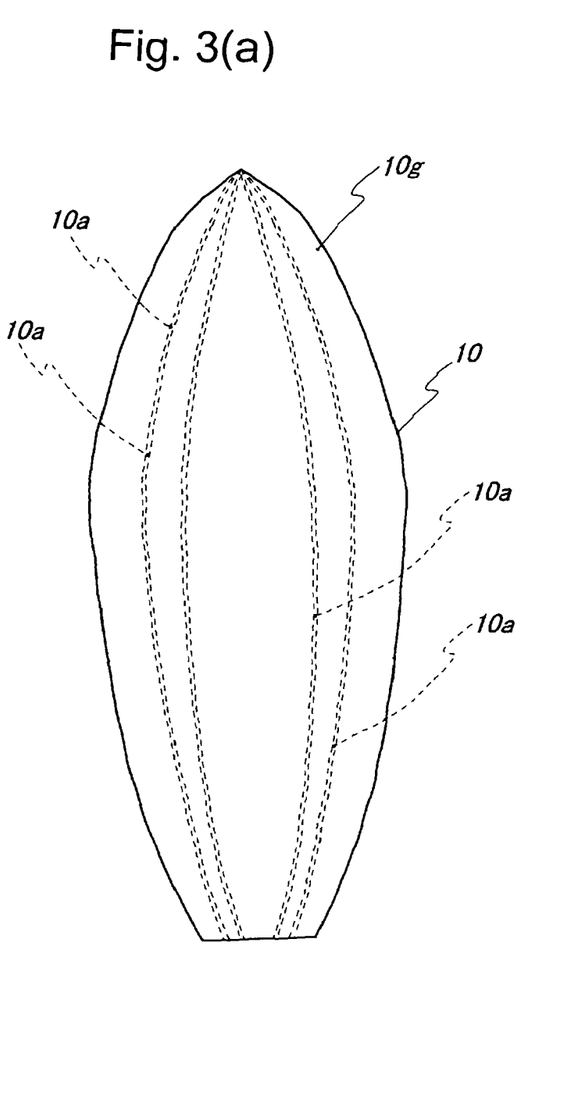
FIG. 3 is a view including a side view and a plan view showing the surfboard incorporated in the preferred embodiment of the present invention.
Figure 3B:
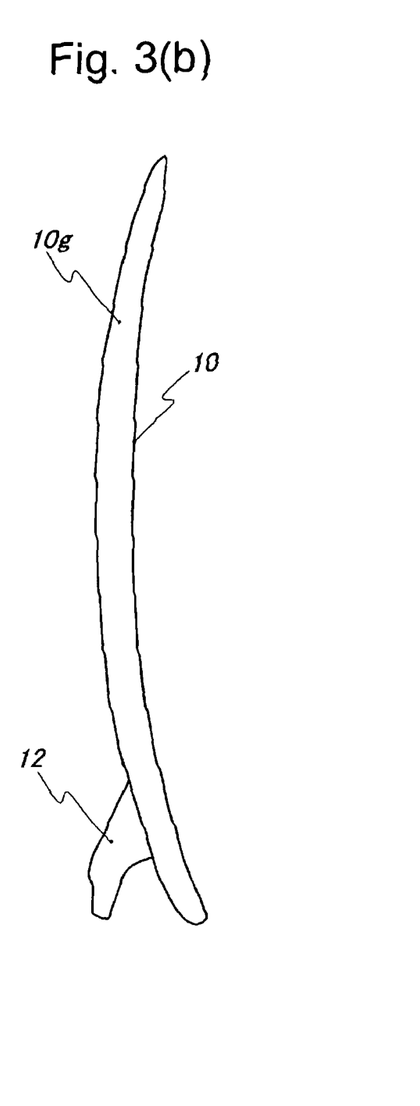

As shown in FIG. 3, the surfboard 10 is provided with a fin 12. The fin 12 can be integrally formed as one unit when the main body of the surfboard is built by the above-explained method. In addition, instead of forming it as one unit, other methods of attaching the fin such as FCS (Fin Control System) which is widely used today can be selected. Here, the FCS is a system related to an attachment structure for attaching a fin to a surfboard including functions of stabilizing, removing, and adjusting the fin.

Figure 8:
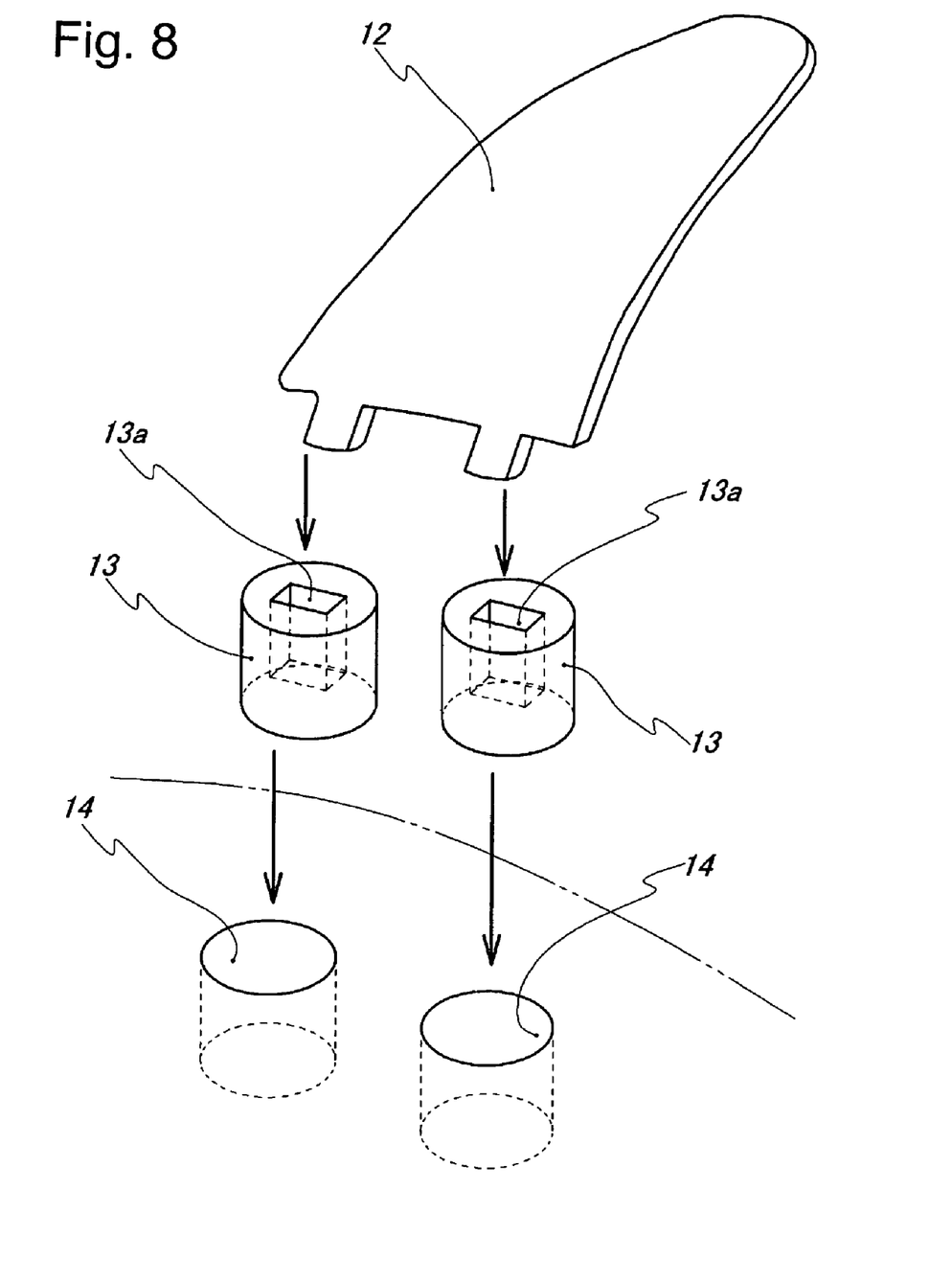
FIG. 8 is a perspective exploded view showing a way of assembling a fin incorporated in the preferred embodiment of the present invention.

As shown in FIG. 8, as an example of method of attaching the fin 12, during the formation of the photo-curing resin, cylindrical grooves 14 which are about 3 mm larger than FCS attaching parts 13 are formed, instead of forming the fin 12 on the main body of the surfboard 10 as one unit. After the formation of the surfboard 10 is completed, the FCS attaching parts 13 are inserted in the grooves 14 where photo-curing resins are filled in the gaps to be cured thereby fixing the FCS attaching parts 13 in a stable manner. The fin 12 is inserted and attached to mounting holes 13a formed on the FCS attaching parts 13 in a detachable manner where a location in the longitudinal direction is adjustable. There are many kinds of shapes and numbers of the fin that will be attached to the mounting holes 13a of the FCS attaching parts 13, and thus, various kinds of selection can be made.

In the surfboard related to the embodiment of the present invention, helium gas is loaded into the hollow structure established by the partition walls and outer shell formed by the above-mentioned formation method.

This is because the helium gas has a specific gravity of 0.14, which is one seventh of the air, and creates a buoyancy equal to the volume of the helium gas in the atmospheric air, thus, the surfboard loaded with the helium gas has a buoyancy equal to the volume of the surfboard, thereby enabling to reduce the weight of the surfboard.

Reduction of the weight of the surfboard owned by the applicant, which is 6.1 feet (185.42 cm) in length in the longitudinal direction, 18.375 inches (46.67 cm) in width in the transversal direction, 2.1875 inches (5.56 cm) in the maximum thickness, is evaluated based on calculations. A size of a surfboard is expressed by a nominal size typically using the above mentioned three types of numbers (length, width, thickness). However, a surfboard is structured by several three-dimensional curves, and even if the above nominal numeric values are the same, there is a large difference in their volumes among different makers and manufacturers. The volume of the surfboard owned by the applicant is 26,096 cm$^3$ by an actual measurement.

Since the helium gas of one mol mass is 4 g, and the air of one mol mass is 29 g, the helium of one mol in the air has a buoyancy of 29−4=25 g. Since one mol=24.51, and 26,096 cm$^3 \neq 261$ l, and 261 l=10.653 mol, the buoyancy is 10.653×25=266.325 g.

In other words, since the surfboard owned by the applicant has the above structure, it can reduce the weight by 266.325 g. The reduction in the weight mentioned here means a difference between the upward vertical force (buoyancy) and the gravity in the downward vertical direction. The surfboard will function even if it is loaded with air or other gas, however, it will become heavier in comparison to the case of filling the helium.

As for the volume of the partition walls, it is within an acceptable error range involved in the actual measurement of the surfboard volume, and thus, it was not reflected in the buoyancy calculations.

The minimum loading pressure is an atmospheric pressure (replacement of gas) and the maximum loading pressure is 0.3 MPa, where a degree of weight reduction, strength, and bounce can be adapted to a particular user. The loading (replacement) in the atmospheric pressure results in the maximum reduction of weight.

Figure 4:
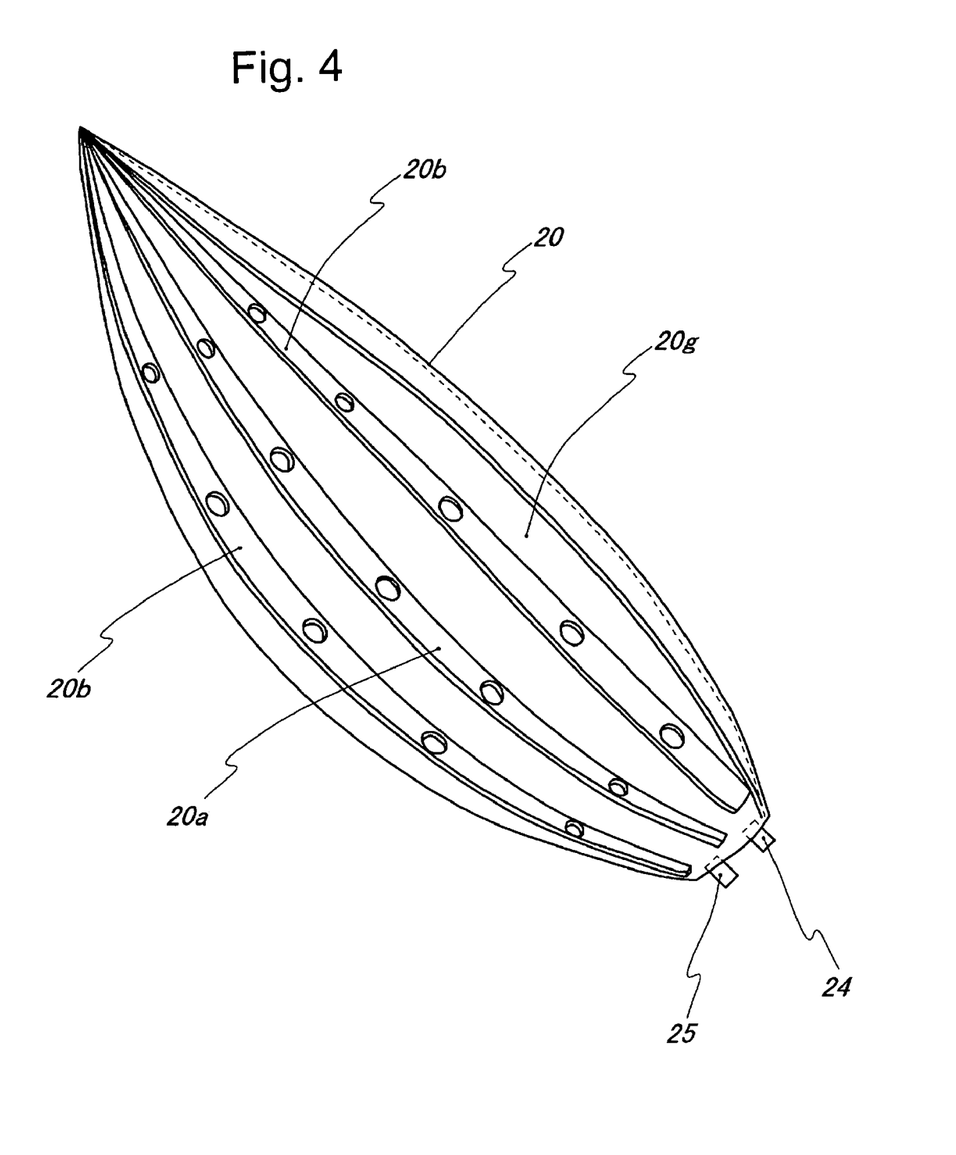
FIG. 4 is a perspective view showing the internal structure of the surfboard related to the preferred embodiment of the present invention.

In the surfboard related to the present embodiment, as shown in FIG. 4, a loading valve (check valve) 24 as well as a release valve (safety valve) 25 are provided at the bottom of the surfboard 20 in the longitudinal direction where the release valve 25 is used for adjusting the pressure in the case of abnormal pressure (high pressure, low pressure) to prevent the expansion and contraction of the surfboard caused by a volume change of the internal gas caused by a temperature change.

An example of a loading valve is a model SC6 check valve manufactured by IBS Corporation. An example of a release valve is a model E292 release valve manufactured by Yamamoto Industries, Inc.

Since the environment under which the surfboard is used is on ocean waters and there is a need of light weight, it is preferable that main bodies, valve elements, and springs used in the check valve and safety valve are made of resin such as PTFE. Further, in the case of using metal, it is preferable to employ corrosion resistant metal (such as SUS316, 316L). The structural parts of the above noted model SC6 check valve are all made of resin, and a valve housing of the above noted model E292 safety valve is made of SUS316 corrosion resistant metal.

The attaching and connecting method of the check valve 24 and the release valve 25 onto the surfboard 20 is achieved by forming a female screw with an aperture size of each valve on the bottom of the surfboard 20 in the longitudinal direction, then connecting the valve by screwing a resin nipple onto the female screw.

The safety valve that is currently in the market has a complicated shape and structure including a pressure adjustment function, however, parts of simple structure that can set an activation pressure by changing a spring rate can also be used in the present invention. If a valve is able to function both of loading and releasing operations, two valves with independent functions will not be needed, thus, one valve having the both functions can be used.

As explained above, the previously mentioned conventional technology allows a user to evaluate only the outer shape and it was not possible for the user to select the degree of elasticity and lightness in weight. In the present embodiment, however, since various parameters for design modification can be available as mentioned above, the design parameters can be changed by reflecting the skills and the purpose of the user. Namely, by adjusting a thickness of the partition walls and outer shell, a location, size and a shape of the vent holes, and a pressure of helium gas in the internal space, the article such as a surfboard with various different features and characteristics can be manufactured even though their outer shapes are completely the same.

As for the optional settings of the design, strength is emphasized when the partition wall is made thicker, and lightweight/elasticity is emphasized when it is made thinner. The strength is emphasized when the outer shell is made thicker, and the lightweight/elasticity is emphasized when the outer shell is made thinner. With respect to the thickness distribution of the outer shell and the partition wall relative to the outer shape, elasticity is emphasized at the part where it is thin, and strength is emphasized at the part where it is thick. Further, the strength is emphasized when the size of the vent hole is small, and the lightweight/elasticity is emphasized when it is large. The elasticity setting at the desired location is possible by the selection of location of the vent hole. As for the helium gas pressure in the internal space, the maximum reduction of weight is achieved at the atmospheric pressure, and the strength is achieved by the higher pressure.

Further, by changing the design modification parameters, a highly durable surfboard with an internal structure suited for beginners, where the outer shell and partition walls are thick, the number of partition walls is increased, and the minimum number of vent holes are established, can be manufactured. As for the internal structure suited for experts and competitions, the outer shell and partition walls are thin, the number of partition walls is reduced, and the size of the vent holes bigger is increased, thereby enabling to produce lightweight and high elasticity surfboard. The proper outer shape for beginners or experts is sufficiently established today, thus, no explanation regarding this issue will be made here.

The photo-curing resin used in the three-dimensional building-up formation method of the present invention is either transparent or milky white, thus, the main body of the surfboard is also transparent, making it possible to observe the underwater. There are patent applications where an observation hole made of a different transparent material is established on a surfboard to observe the underwater, however, there are many problems related to the structure and material that still need to be solved, and thus, there is no example that has been actually implemented for practical use. In the surfboard related to the present embodiment, observation under the water is possible without using the components made of different materials that cause the weakness in strength and structure.

In the case where observation inside the water is not taken into consideration, the resin after it has been formed and cured may be deteriorated by UV rays since the photo-cured resin used in the three-dimensional building-up formation method of the present invention is transparent or milky white. Therefore, it is preferable to either apply a coating that blocks the UV rays or use resin material having a UV ray resistant function.

In the above-mentioned embodiment, the surfboard for surfing has been explained as an example, however, the present invention can also be applied to a structure and production method of a recreational surface water article that has a similar function as the surfboard, i.e., an article such as a body board, wake board, wind surfboard, buoy, and floating ring, for instance.

FURTHER EMBODIMENT

In addition to the above-mentioned embodiment, the technical ideas related to the present invention can be implemented in further embodiments described below.

The further embodiments will be explained with reference to FIGS. 9 to 11.

Figure 9:
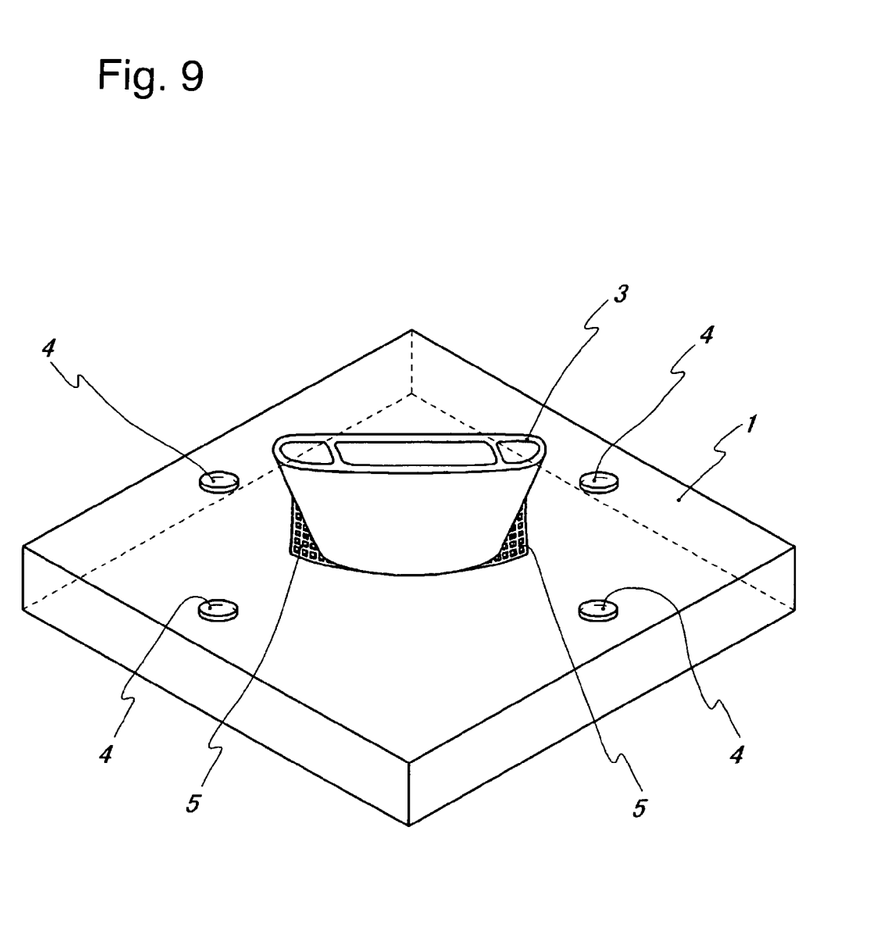
FIG. 9 is a perspective view showing an initial stage of the manufacturing process related to another preferred embodiment of the present invention.

FIG. 9 shows a base support 5 for stabilizing the initial condition of the building-up formation until the supports 4 for holding the entire board in FIG. 2 are built up and unified with the main body. These base supports 5 are, similar to the supports 4, the light is irradiated based on their surface data along with the surface data of the main body and formed at the same time with the main body. These base supports 5 are not necessary to the product, and will be removed after the main body is completed. Due to this reason, the structure is preferably the one that can be cut off or folded and removed, in other words, it is formed as a flat brush structure, mesh structure, hollow structure, or wafer structure, etc.

Figure 10:
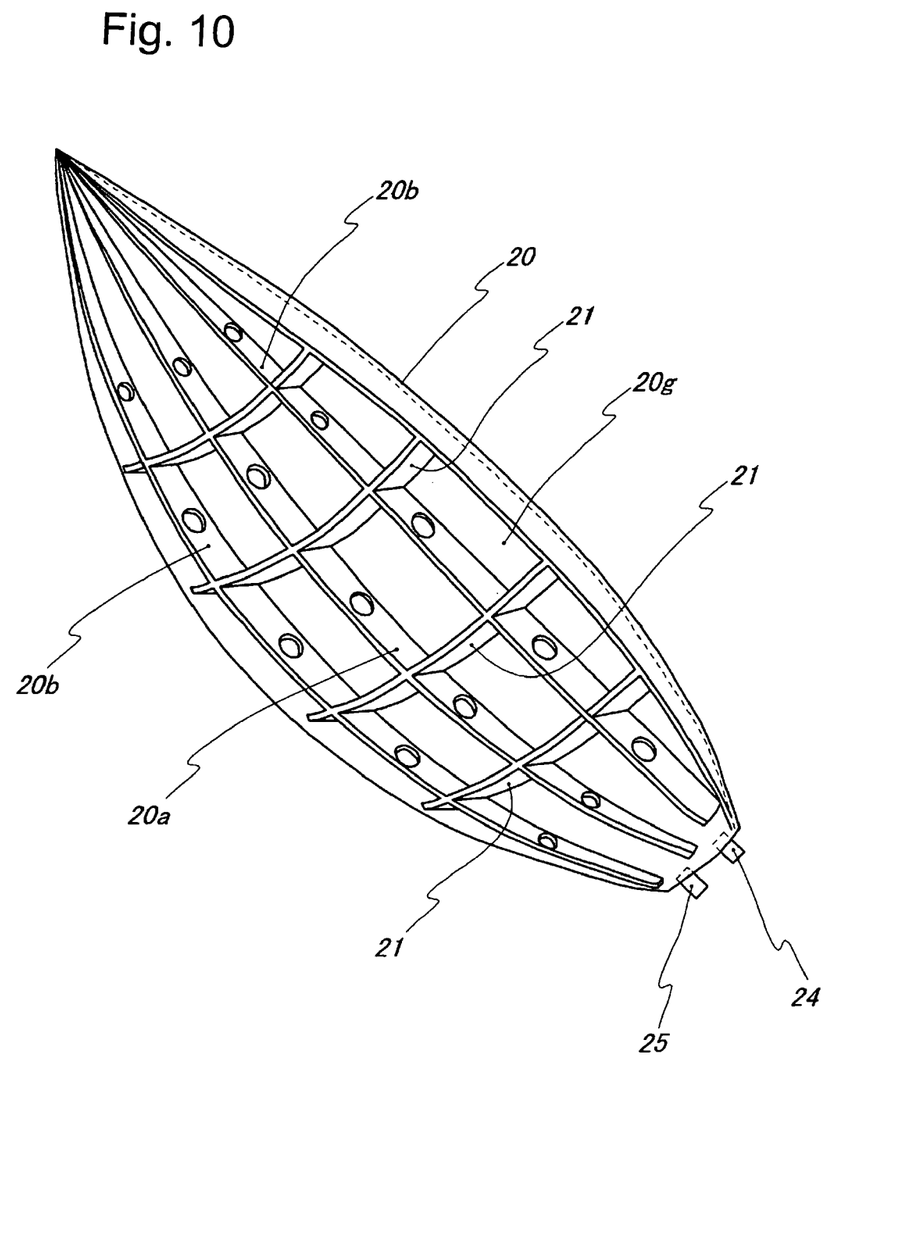
FIG. 10 is a perspective view showing the internal structure of the surfboard related to another preferred embodiment of the present invention.
Figure 11:
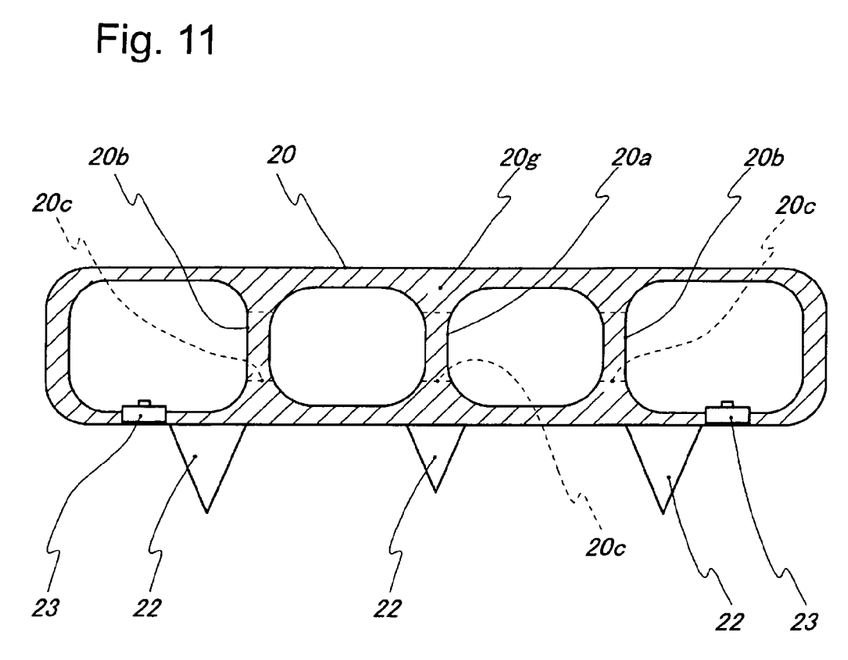
FIG. 11 is a cross sectional view showing a transversal cross section of the surfboard related to another preferred embodiment of the present invention.

Next, the embodiment of FIG. 10 shows an example of the partition walls which are also placed in the transversal direction in the internal space of the outer shell to form a grid, unlike the case where they are placed only in the longitudinal direction in the example of FIG. 4. By doing so, sectioned spaces that are divided in the longitudinal direction of the surfboard 20 are formed. In these grid-like spaces, a sectioned space with air-tightly sealed with respect to the outside and desired capacity can be formed at a desired location by arranging the vent holes 20c. By applying the pressure by filling the inactive gas or air, or by reducing the pressure in this sectioned space, different amounts of pressure can be set in the individual sectioned spaces, thereby enabling to set different strength and buoyancy for each part of the surfboard. Further, as shown in FIG. 11, since the sectioned spaces are air-tightly sealed, the pressure change in the internal space caused by an excessive change in external temperature has to be compensated. Thus, an adjusting valve 23 for loading or releasing the pressure is attached on the surface of the outer shell that corresponds to each sectioned space to avoid damages from expansion due to excessive pressure.

INDUSTRIAL APPLICABILITY

The article such as a surfboard and its manufacturing method in the present invention described above can mass produce surfboards of the same shape and performance in a short time, which could not be fulfilled by the surfboard of hollow structure in the conventional technology. On the other hand, the present invention can design and easily manufacture a personalized surfboard that is specific to preference and ability of a particular user with a wide range of freedom. Thus, the present invention is able to fulfill the requests that are thought to be essentially contradicting with one another, and are sufficiently applicable in the industry.

What is claimed is:

1. A method for manufacturing an article for water sports, comprising the following steps of:
   uniformly supplying a liquid of pre-cured photo-curing resin at a predetermined depth on a table that is capable of moving up and down while maintaining a horizontal plane;
   irradiating a light beam on a surface of the liquid of photo-curing resin based on two-dimensional surface data that expresses a virtual cross sectional surface of a predetermined end part of the article extracted from three-dimensional shape data that expresses a three-dimensional shape of the article;
   creating a first solid piece layer with a predetermined thickness based on the surface data by curing the resin that has been irradiated;
   lowering the table at a predetermined depth and supplying a liquid of pre-cured photo-curing resin on top of the first solid piece layer;
   irradiating a light beam onto said liquid of pre-cured photo-curing resin based on surface data of a virtual cross sectional surface adjoining the virtual cross sectional surface that has constructed said first solid piece layer in an overlapping manner to connect a second solid piece layer to the first solid piece layer so that they are integrally united; and
   sequentially repeating the above steps until n-th layer that corresponds to an end of the article, where all layers are unified by building-up the photo-curing resin to thereby ultimately form the three-dimensional shape of the article;
   wherein said three-dimensional shape of the article is configured by an outer shell having a hollow structure for forming an outer shape of the article, a partition wall arranged within the hollow structure of the outer shell for forming a plurality of sectioned spaces, and a vent hole formed on each partition wall so that gas can pass through the plurality of sectioned spaces.

2. A method for manufacturing the article for water sports as defined in claim 1, further comprising:
   adding shape data for forming a support to the shape data for forming the article where the support is attached to the article to support the article during the formation process;
   extracting cut-off surface data from the shape data of the support and from the shape data of the article; and
   forming a main body of the article and the support at the same time by irradiating the light beam either at the same time or in a continuous manner on said photo-curing resin.

3. A method for manufacturing the article for water sports as defined in claim 1, wherein said light beam is a laser beam, an ultraviolet ray, or a visible ray, and said gas is helium, nitrogen or air which is filled in the sectioned spaces of the article with a predetermined pressure.

4. A method for manufacturing the article for water sports as defined in claim 1, wherein said outer shell and partition wall of the article are integrally formed at the same time as one unit.

5. A method for manufacturing the article for water sports as defined in claim 3, wherein said predetermined pressure of said gas is adjusted so that an inner pressure of one sectioned space is different from that of another sectioned space.

6. A method for manufacturing the article for water sports as defined in claim 3, further comprising the steps of:
   forming a loading valve for loading the gas into the sectioned spaces; and
   forming a pressure adjusting valve for releasing the gas from the sectioned spaces in response to the pressure variation of the loaded gas.

7. A method for manufacturing the article for water sports as defined in claim 1, wherein the outer shell is formed thinner at an area close a center of the article than at an area close to an end of the article in a longitudinal direction thereof.

8. A method for manufacturing an article for water sports, comprising the following steps of:
   uniformly supplying a liquid of pre-cured photo-curing resin at a predetermined depth on a table;
   extracting shape data that expresses a cut-off shape of a virtual cross-sectional surface perpendicular to a longitudinal direction of the article from shape data of the article;
   irradiating a light beam onto said photo-curing resin in response to the extracted shape data to form a resin layer of predetermined thickness; and
   lowering the table by one layer after the irradiation of the light beam for curing the resin layer is completed and repeating the above operation to combine the cured resin layers that have been repeatedly formed in multiple times to thereby ultimately form a three-dimensional shape of the article;
   wherein said three-dimensional shape of the article is configured by an outer shell having a hollow structure for forming an outer shape of the article, a partition wall arranged within the hollow structure of the outer shell for forming a plurality of sectioned spaces, and a vent hole formed on each partition wall so that gas can pass through the plurality of sectioned spaces.

9. A method for manufacturing the article for water sports as defined in claim 8, further comprising:
   adding shape data for forming a support to the shape data for forming the article where the support is attached to the article to support the article during the formation process;
   extracting cut-off surface data from the shape data of the support and from the shape data of the article; and
   forming a main body of the article and the support at the same time by irradiating the light beam either at the same time or in a continuous manner on said photo-curing resin.

10. A method for manufacturing the article for water sports as defined in claim 8, wherein said light beam is a laser beam, an ultraviolet ray, or a visible ray, and said gas is helium, nitrogen, or air which is filled in the sectioned spaces of the article with a predetermined pressure.

11. A method for manufacturing the article for water sports as defined in claim 10, wherein said predetermined pressure of said gas is adjusted so that an inner pressure of one sectioned space is different from that of another sectioned space.

12. A method for manufacturing the article for water sports as defined in claim 10, further comprising the steps of:

forming a loading valve for loading the gas into the sectioned spaces; and     forming a pressure adjusting valve for releasing the gas from the sectioned spaces in response to the pressure variation of the loaded gas.

\* \* \* \* \*